United States Patent

[11] 3,609,242

[72] Inventors Francois Le Prince
Sainte-Genevieve-des-Bois;
Andre Boury, Paris, both of France

[21] Appl. No. 845,213

[22] Filed July 28, 1969

[45] Patented Sept. 28, 1971

[73] Assignee International Standard Electric Corporation New York, N.Y.

[32] Priority Aug. 1, 1968

[33] France

[31] 161,443

[54] AWAITING CALL INDICATOR SYSTEM
3 Claims, 2 Drawing Figs.

[52] U.S. Cl. .......... 179/8 A

[51] Int. Cl. .......... H04m 3/36

[50] Field of Search .......... 179/8 A, 18 BG, 27 FB, 27 FC, 27 FF, 84 B, 6 A

[56] References Cited

UNITED STATES PATENTS

| | | | |
|---|---|---|---|
| 2,876,282 | 3/1959 | Callaway .......... | 179/8 |
| 3,328,538 | 6/1967 | Germanton .......... | 179/8 |

*Primary Examiner*—Kathleen H. Claffy
*Assistant Examiner*—Jan S. Black
*Attorneys*—C. Cornell Remsen, Jr., Walter J. Baum, Percy P. Lantzy, J. Warren Whitesell, Delbert P. Warner and James B. Raden

ABSTRACT: Awaiting call indicator system is associated with PABX operators' desks. It enables measuring the duration of public network incoming lines congestions and makes it possible to estimate at any moment the number of awaiting calls. It displays the measurements made with the help of a luminous indicator, this latter to be so-called "call-awaiting thermometer."

AWAITING CALL INDICATOR SYSTEM

Figure 1:
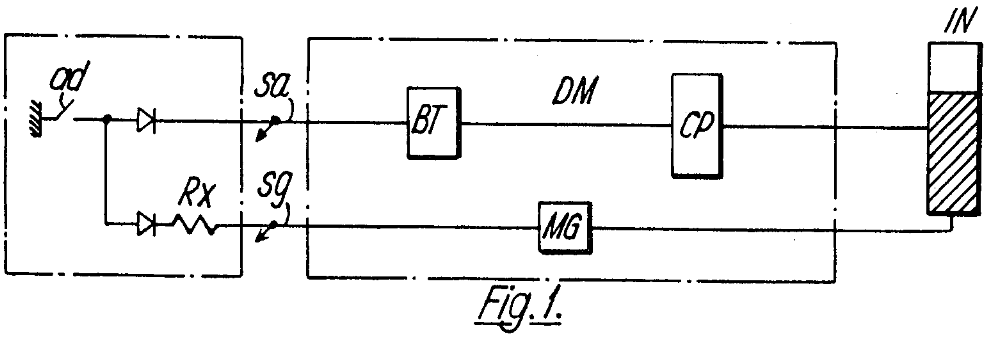

The present invention concerns an awaiting call indicator system, and, more particularly, a system provided for indicating the duration of the call-congestion periods in a traffic-handling center. Namely, though in nonexclusive manner, this invention can be applied in telephone exchanges where the whole or part of the traffic is handled by operators.

Indeed, when operators are to handle all or part of the traffic of a telephone installation, it is attempted to adapt as exactly as possible the number of operators to the traffic. If the traffic exceeds the value considered, or if activity of the operators is not sufficiently, a congestion takes place during which the calls are handled with more or less delay. An awaiting call indicator, then, reveals itself to be most advantageous, as much for the operators themselves as for the responsible staff, for indicating the duration of those periods of call-congestion. This indicator will attract the attention of the ones on necessity to increase the traffic-handling speed, and will signal to the others that the traffic exceeds the possibilities of the operators (or of the equipment).

The present invention therefore concerns a simple and inexpensive awaiting call indicator that provides an easy-to-read indication.

One feature of the invention is an awaiting call indicator system comprising, namely: mans for signalling the call-awaiting associated with each traffic source; a time base, starting into operation as soon as a traffic source sends out a call-awaiting signal, and providing periodical time base signals; and, display means controlled b the counter ; these different means being so arranged that when a first call-awaiting signal originates, the time base enters into operation; the counter starts from a rest position and steps, step by step; the display means provide a call-awaiting indication corresponding to the position of the counter and characterizing the time elapsed since the originating of the first call-awaiting signal, and this will go on as long as at least one signal is present, the system only restoring to rest condition when all call-awaiting signal has disappeared.

According to another feature of the invention, the counter is restored to rest condition at the moment where a first call-awaiting signal originates, and, will then step, step by step, as soon as the time base operates and will remain in the position it occupies when all signalling disappears and the time base stops.

According to another feature of the invention, the position of the counter will only be transmitted to the display means when at least one call-awaiting signal is present and this will make it possible, when all signalling disappears, to leave the counter in a whatever position, without any inconvenience.

Figure 2:
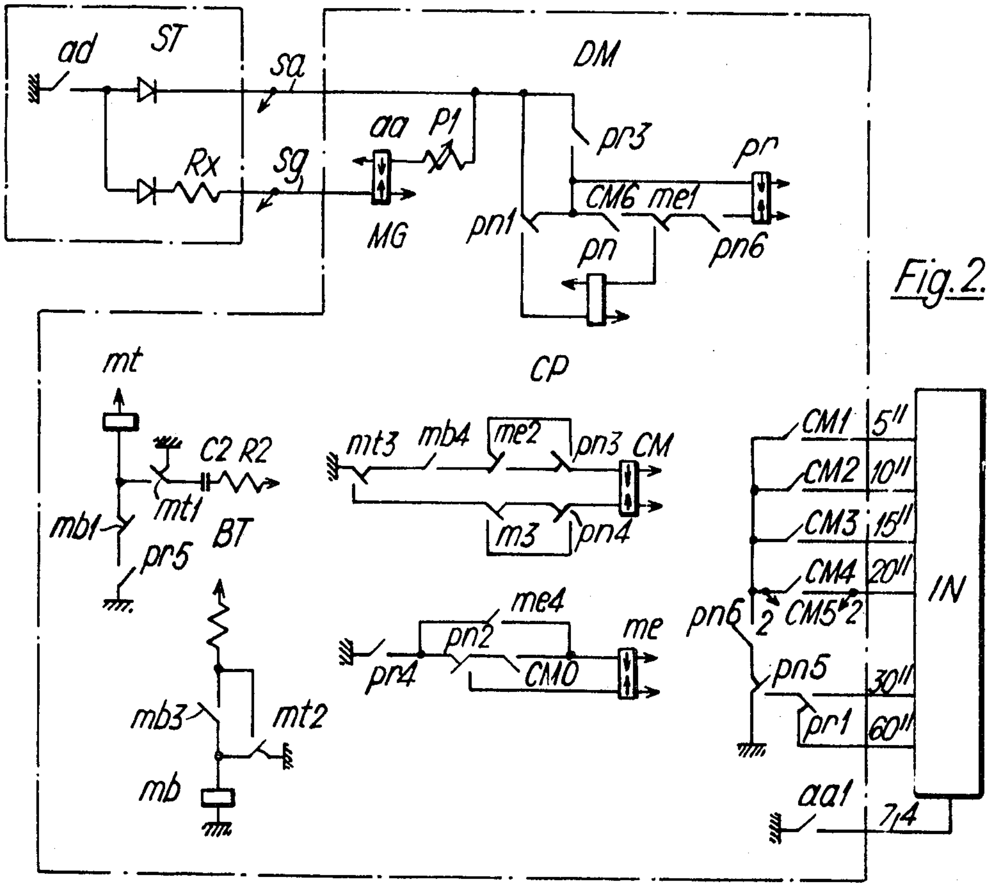

According to another feature of the invention, every signalling source will send, moreover, a galvanometric signal at the same time as the call-awaiting signal; and means are provided for estimating, at any instant, the number of galvanometric signals; and also, for displaying an indication corresponding to the number of awaiting traffic sources. Different other features of the invention will become apparent from the description that follows, given by way of nonlimiting example, in conjunction with accompanying drawings comprising:

FIG. 1, the block diagram of the system, object of the present invention;

FIG. 2, the detailed circuits of an embodiment of the present invention.

The system in FIG. 1 comprises: a certain number of traffic sources such as ST, a measuring device DM and an awaiting call indicator IN.

If this system is employed in a private telephone exchange which is connected to the public network exchange, the traffic sources could for instance be the public network lines specialized for the incoming traffic. In each source, every time a call originates and until it is put through, a contact *ad* closes. It provides an awaiting call signalling earth potential, through a decoupling diode, along a common awaiting conductor *sa*. It also provides an earth potential, through a standard resistor Rx and another decoupling diode along a common galvanometric estimation conductor *sg*.

In the device DM, as soon as the conductor *sa* is earthed, a time base BT starts operating. It provides periodic impulses to a counter CP. The counter CP starts from a rest position and steps, step by step. Operation of the time base and of the counter progresses, thus, as long as the conductor *sa* is earthed; that is to say, as long as there is awaiting traffic. At any instant, the position of the counter CP is communicated to an awaiting call indicator IN.

Simultaneously, the current flowing along the wire *sg* is estimated by a galvanometric measuring circuit MG which provides an indication as to the number of awaiting sources. This indication is also The indicator IN therefore receives, in that way, two items of information: the duration of a call-congestion period and the number of awaiting calls. It displays them, for instance, in the form of a red luminous column whose height characterizes the duration of the period of congestion and whose brightness characterizes the number of waiting calls. This originates a synthetic information easy to interpret.

Now will be described, in referring to FIG. 2, the circuits of an embodiment of the present invention. There will be found, in FIG. 2, all the elements of the diagram in FIG. 1. FIG. 2 provides particularly the detailed circuits of the time base BT, of the counter CP and of the measuring device MG.

These circuits are realized by means of relays and of a magnetic counter whose coil is illustrated in the figure by a rectangle bearing on either side the connections of one or two windings, and whose contacts, according to the detached contact representation, are positioned anywhere on the diagram. A relay is referenced, in the diagram, by two letters, and its contacts bear the same reference followed by a number. Same applies to the magnetic counter which bears the reference CM. All the circuits are current supplied by a battery whose positive terminal is earthed. The circuits leading to the negative terminal are ended by an arrow.

It will be assumed that, initially, the relays are in rest condition and that the magnetic counter CM is in a whatever position, say in position 4 for instance. The indication IN does not receive any indication. It is worth noting that the capacitor C2 is charged, by *mt*1, between the earth potential and the negative potential.

As was mentioned above, the contact *ad* closes in a calling traffic source. It connects the wire *sa* to earth through a decoupling diode. In response, the contact *pn*1 being closed, the relay pr is energized by its upper winding and holds by its contact *pr*3.

The contact *pr*5 closes and energizes the relay *mt* of the time base BY. The contact *mt*meoperates and, through *me3 3 and ph*4, energizes the lower winding of the magnetic counter CM which is the main element of the counter CP. This lower winding is the restoring winding, and the counter immediately leaves the position 4 in order to come into position O. The contact CMO closes. Due to this, the relay *me* energizes, through *pr*4, *pn*2 and CMO; it prepares its holding through *me*4. Operation of the contact *me*3 breads the CM restoring circuit.

It is seen, in the case where counter is initially in position 0, that the relay *me* energizes immediately after *pr* and that the restoring control is not given to CM.

The time BT comprises relays *mt* and *mb*. It was just mentioned above that the relay *mt* energizes as soon as *pr*5 is closed. The contact *mt*1 operates and connects the capacitor C2 to the relay *mt*. The capacitor C2 is charged and its charge is held by the earth potential provided by *pr*5 and *mb*10 The contact *mt*2 operates and energizes the relay *mb*. This latter ensures its holding through *mb*3. Opening of *mb*1 breaks the earth potential of relay *mt* and capacitor C2.

The capacitor C2 then discharges through the relay *mt* and holds this latter in operating condition for a certain while, say 5 seconds for instance. During, all this time interval, the operation of the device remains in suspense.

When the capacitor C2 is sufficiently discharged, the relay *mt* releases. At this instant, the upper winding of the magnetic counter CM is energized by *mt*3, *mb*4, *me*2 (operating), *pn*3 (at rest). The counter Cm is energized, but does not yet leave position 0.

Simultaneously, the relay *mb* is short-circuited by the contact *mt*2. Capacitor C2 is recharged by contact *mt*1, resistor R2 limiting the current. With a certain delay, which corresponds to the discharge of self-inductance of its winding, the relay *mb* releases. Capacitor C2 has thus had the time for fully recharging.

The contact *mb*4 opens and breaks the circuit of the upper winding of counter CM which steps into position 1.

Contact *mb*1 closes again and reestablishes the circuit of relay *mt* which will reenergize. The operating process just described above will renew itself again for as song as relay *pr* remains in operation. It requires about five seconds and it comprises the following stages:

energizing of *mt*;
energizing of *mb*;
delayed release of *mt*;
energizing of cm;
delayed release of *mb*;
stepping by one step of CM.

This cycle will reproduce itself as long as conductor *sa* stays earthed and the counter CM will step, step by step, right up to position 6, at the rate of one step every five seconds. During this time interval an indication of increasing duration will be provided through the initiating of an earth potential, onto the indicator IN, along one of the conductors 5′′, 10′′, 15′′, 20′′.

When the counter reaches position 6, the relay *pn* energizes, upon earth potential of wire *sa*, through *pr*3, CM6 and *me*1. It is blocked on this earth through *pn*. The relay *mt*, becoming energized, since the time base continues operating, the lower winding of the magnetic counter CM will then be energized by *mt*3, *me*3 and *pn*4 operating. The magnetic counter, immediately after, restores to position 0. Because of this, the lower winding of relay *me* is energized through *pr*4, me4, CMO, *pn*2, and this latter relay releases. The circuit for the stepping of magnetic counter CM is now established through *me*2, in rest condition, and *pn*3 operating. Whereas the restoring circuit is broken by *me*3.

Since time-base is still in operation, the magnetic counter CM starts again from position 0 and steps, step by step, if of course the conductor *sa* remains earthed However, during this second cycle there is not given any 5-second short call-awaiting indication, as previously, but a simplified indication signalling that the duration of line congestion exceeds 30 seconds, and this through the sending of an earth potential along wire 30′′ (make contacts *pn*5 and *pr*1.)

When counter Cm reaches position 6 for the second time, the lower winding of relay *pr* is energized through *pr*3, CM6, *me*1 and *pn*6. Relay *pr* releases and is disconnected from wire *sa* at opening of *pr*3. Opening of *pr*5 stops the operation of time base BT.

Operation of the device ceases, relay *pn* remaining alone in operation as long as wire *sa* remains earthed. An earth potential is sent along wire 60′′, through *pn*5 and *pr*1, in order to signal that the duration of the congestion exceeds 1 minute.

When every call disappears, the relay *pn* will release but the counter CM will remain in position 6; this does not occasion any disadvantage since the contacts *pn*5 and *pn*6 prevent an display.

There now remains to describe the means that make it possible, in the present embodiment of the invention, to measure the number of awaiting calls. These means simply include the single telegraph relay *aa*. It is seen therefore that for each awaiting call, the lower winding of said relay receives an earth potential through a resistor Rx. Since the value of this resistor is high, as against resistance of the winding, it can be considered that this winding receives a current proportional to the number of awaiting calls. On the other hand, whatever ma be the number of awaiting calls, the upper winding of the relay receives an earth potential through an adjusting resistor P1. The windings and the currents are calculated so that, as long as the number of awaiting calls is less than 4, the relay remains in rest condition; influence of the upper winding being preponderant. If there are four awaiting calls, or more, the relay *aa* passes onto operating condition and its contact *aa*1 sends an earth potential along the wire$\geq$4.Thus is obtained simple signalling of the number of awaiting calls, and this signal can be originated together with the indication of duration of awaiting call; as was already mentioned above.

It is understood the foregoing description of a specific embodiment of this invention is made by way of example only and is not to be considered as a limitation on its scope. claim:

We claim:

1. A call-awaiting indicator system comprising, call-awaiting means associated with each traffic source in a telephone system, activated when a source is awaiting service, time-based circuit means for originating periodic time-base signals, means responsive to activation of a call-awaiting means for initiating the transmission of said signals, means for stepping a counter step by step in response to transmitted signals, and display means operatively controlled by the counter for providing an indication corresponding to the position of the counter for indicating the elapsed time since the origination of the activation call-awaiting means.

2. The system of claim 1 including means for maintaining said display means operated as long as at least any call-awaiting means remains activated, and means for restoring the system to a rest condition when every signal has disappeared.

3. The system of claim 1, wherein there is means for acting on said display means to further indicate the number of traffic sources awaiting service.